No. 866,927. PATENTED SEPT. 24, 1907
R. A. GEHAN.
TIRE.
APPLICATION FILED DEC. 18, 1905.

Witnesses:-
R. W. Rumer.
E. A. Vock

Inventor
Robert A. Gehan,
by Wilhelm Parker Hart,
Attorneys.

UNITED STATES PATENT OFFICE.

ROBERT A. GEHAN, OF BUFFALO, NEW YORK.

TIRE.

No. 866,927.  Specification of Letters Patent.  Patented Sept. 24, 1907.

Application filed December 18, 1905. Serial No. 292,146.

*To all whom it may concern:*

Be it known that I, ROBERT A. GEHAN, a citizen of the United States, residing at Buffalo, in the county of Erie and State of New York, have invented a new and useful Improvement in Tires, of which the following is a specification.

This invention relates to improvements in cushion tires for use upon the wheels of bicycles, automobiles and similar vehicles, and relates particularly to that class of cushion or elastic tires in which the tire is hollow or in the form of a tube and internal metallic springs are employed to hold the tube from collapsing and to give the required elasticity to the tire.

The principal object of this invention is to produce an elastic tire which will possess the advantages in the size and shape of the tread, resiliency and elasticity of the pneumatic tire and at the same time be free from its well known defects. This is done without the employment of internal air pressure by providing a practically continuous internal coiled spring support for the hollow tire or shoe which will readily yield to all irregularities in the surface of the road and cushion the jar on the wheels.

Other objects of this invention are to provide an adjustable clamping means for securing the spring support and its inclosing tube or shoe to the rim of the wheel in such a manner that all circumferential or "creeping" movement of the tire is prevented, and that the different parts thereof can be readily tightened or released as occasion may require, and to provide means for preventing the coiled tire spring from being compressed to such an extent as to become permanently set or flattened.

Figure 1:
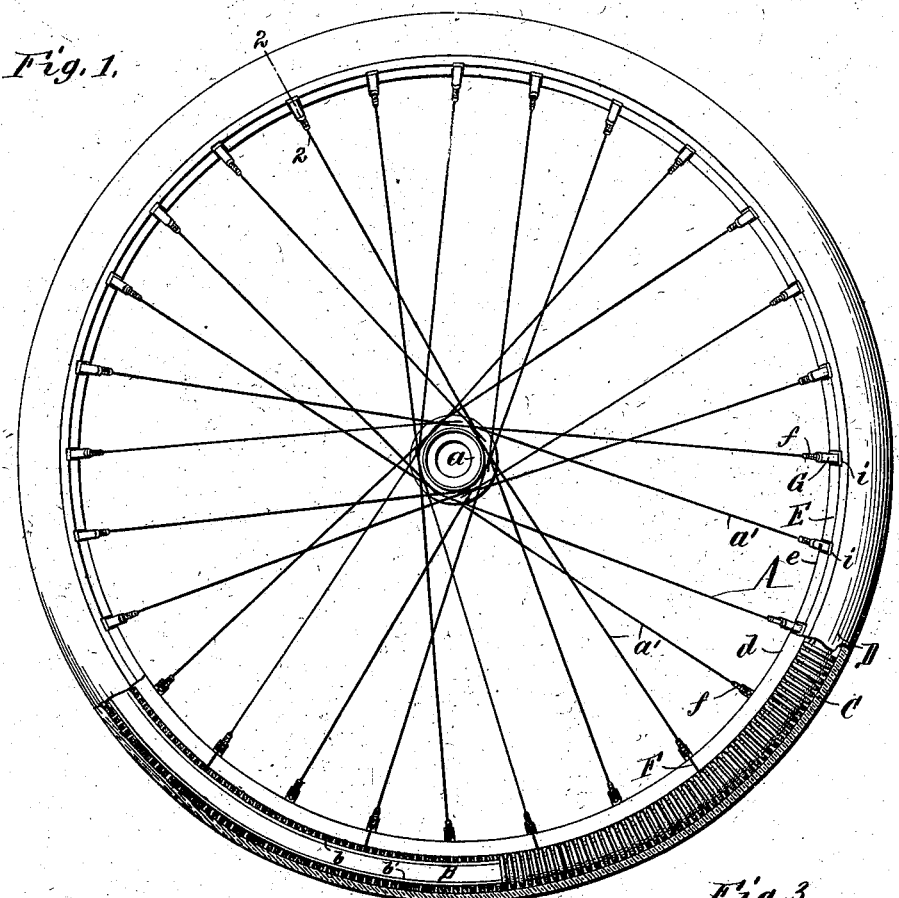
Figure 2:
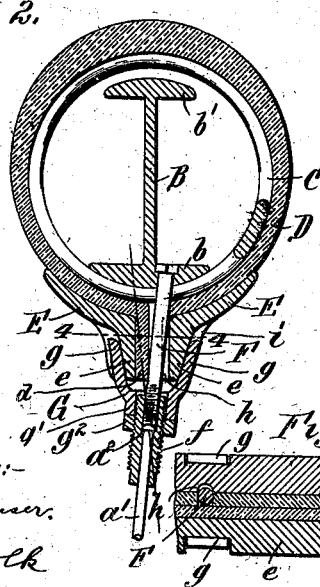
Figure 3:
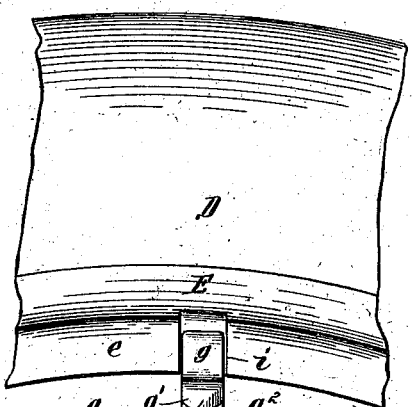

In the accompanying drawings: Figure 1 is a side elevation of a bicycle wheel equipped with a tire embodying the invention, portions of the tire being broken away to show the spring support and the felly of the wheel. Fig. 2 is an enlarged cross sectional elevation in line 2—2, Fig. 1. Fig. 3 is an enlarged side elevation of a portion of the tire and its clamping means. Fig. 4 is a fragmentary sectional view of the rim and tire clamping means in line 4—4, Fig. 2.

Like letters of reference refer to like parts in the several figures.

A represents a bicycle wheel having a hub $a$ and spokes $a'$ of the ordinary construction.

B represents the rim or felly of the wheel which consists of a ring or annular body having a flanged or widened inner edge portion $b$ to which the spokes $a'$ are secured, as hereinafter described, and a flanged or widened outer edge portion $b'$ which constitutes a buffer for the tire spring. The outer faces of the spoke attaching and buffer portions of the felly or rim are convexed.

C represents a coiled supporting spring which in-closes the wheel felly or rim. This supporting spring C is made of continuous spring wire coiled around the wheel felly or rim, and is of somewhat greater diameter than the radial width of the felly B so that when its inner portion is in position against the spoke attaching portion $b$ of the felly, the outer portion of the spring will be at some distance from the buffer portion $b'$ of the felly, thus permitting freedom of movement of the outer or tread portion of the spring until the same has been forced inwardly against the buffer portion of the felly, after which all further pressure bears directly upon and is sustained by the felly. This prevents the spring C from being crushed or collapsed under sudden or excessive pressure to such an extent as to become permanently set or flattened and its resiliency destroyed or impaired.

The spring C is encircled by a suitable protecting covering or shoe D of rubber or some other strong flexible material of a character to give a durable practical tire tread, and this shoe and the spring C are held in position on the felly B by opposing clamping rings E E. These clamping rings extend about the inner periphery of the tire concentric with the felly B, one on each side thereof, and have outer faces which are concaved to bear evenly against the convexed surface of the shoe, and inwardly extending flanges $e$ adapted to engage and clamp between them similar flanges $d$ upon the shoe D. The shoe is of an internal diameter to closely embrace the spring C, and the convexed surface of the spoke attaching portion of the felly is of the same curvature as the interior of the spring, so that the spring and shoe can be securely clamped between the felly and the clamping rings by drawing these parts together. In the wheel shown in the drawings the spokes are connected to the felly or rim B by rods or bolts F which also serve to draw the felly and clamping rings together to hold the tire. These bolts have heads on their outer ends which engage the spoke attaching portion $b$ of the felly and their inner ends are threaded and secured into internally threaded adjustable sleeves $f$ provided with internal shoulders against which heads $a^2$ of the spokes $a'$ bear. The inner end of the sleeve $f$ is shaped so that a wrench can be fitted thereon and the sleeve turned to tighten the spokes as desired.

G represents clamping devices having oppositely extending arms $g$ adapted to engage the clamping rings E, and a hollow body portion $g'$ surrounding the adjusting sleeve $f$ and held in position thereon by a nut $g^2$ which engages an external thread thereon. The arms $g$ engage the flanges $e$ of the clamping rings E at such an angle that when these arms are forced outwardly by turning the nut $g^2$, they serve to press the clamping rings E firmly against the tire spring and its shoe on the inner side of the felly and at the same time draw these opposing clamping rings toward each other so that the flanges e of the clamping rings closely clamp the flanges d of the shoe, thus firmly securing the shoe against movement and binding all the parts securely together.

Suitable openings h are provided in the inner sides of the clamping rings for the passage of the connecting rods F and notches or seats i are provided on the outer side of the rings in which the arms of the clamping devices engage to better hold the parts in place.

The spoke attaching sleeve f and adjusting nut $g^2$ can be separately operated for tightening the spokes of the wheel and the clamping devices so that the adjustment of these parts can be effected independently of each other.

Although the adjusting means described are believed to be desirable for the purpose intended, it is obvious that other means could be employed for obtaining these adjustments.

By passing the spokes and their connecting rods through between the opposing clamping rims and between the coils of the spring to the felly and securing the clamping device to the spokes, it is possible to produce a very firm and rigid construction and prevent the movement or "creeping" of any of the parts.

I claim as my invention:

1. In a wheel, the combination of a continuously coiled spring of substantially the same diameter throughout its length, a felly entirely surrounded and inclosed by said spring, spokes secured to said felly, and means for clamping the coils of said spring against the inner periphery of said felly to hold said spring in position and prevent endwise movement thereon, substantially as described.

2. In a wheel, the combination of a continuously coiled spring of substantially the same diameter throughout its length, a felly entirely surrounded and inclosed by said spring, spokes secured to said felly, a covering inclosing said spring, and means for clamping said covering and the coils of said spring against the inner periphery of said felly to hold the same in position and prevent endwise movement thereon, substantially as described.

3. In a wheel, the combination of a felly, spokes secured thereto, a coiled spring entirely surrounding and inclosing said felly, opposing clamping rings external to said spring, and means for forcing said clamping rings and felly toward each other to hold said spring in position thereon, substantially as set forth.

4. In a wheel, the combination of a felly, spokes secured thereto, a coiled spring entirely surrounding and inclosing said felly, opposing clamping rings external to said spring and said felly at the inner side thereof, and means external to said felly for adjusting said clamping rings toward said felly, substantially as set forth.

5. In a wheel, the combination of a felly, spokes secured thereto, a coiled spring entirely surrounding and inclosing said felly, opposing clamping rings external to said spring and said felly at the inner side thereof, and means on the spokes of said wheel for adjusting said clamping rings, substantially as set forth.

6. The combination of a coiled tire spring, a wheel rim located within said spring, a split cover inclosing said spring and having projecting flanges, clamping rings at opposite sides of said flanges, and means for forcing said rings together to clamp said cover flanges, substantially as set forth.

7. The combination of a coiled tire spring, a wheel rim located within said spring, a cover inclosing said spring, clamping rings for securing said spring and cover to said rim, and spokes which are secured to said rim and pass through said clamping rings, cover and spring to hold said parts from movement relative to said rim, substantiated as set forth.

Witness my hand, this 13th day of December, 1905.

ROBERT A. GEHAN.

Witnesses:
EDWARD C. HARD,
C. B. HORNBECK.